E. G. WATROUS.
VALVE.
APPLICATION FILED AUG. 17, 1910.
1,103,638.
Patented July 14, 1914.
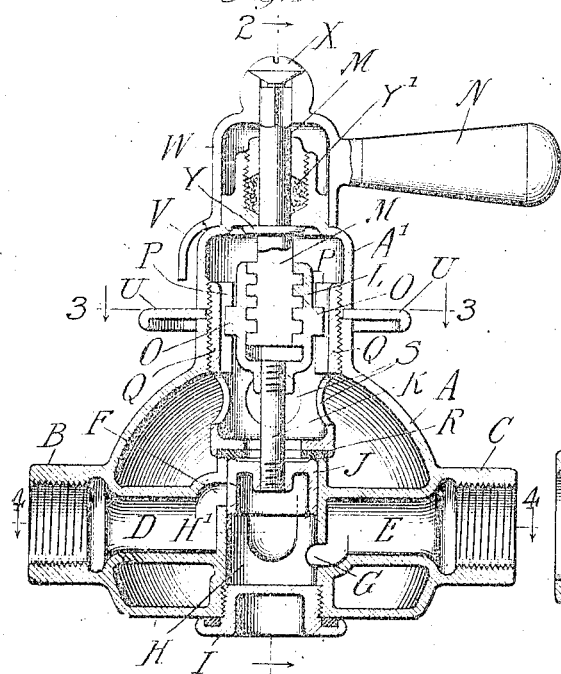
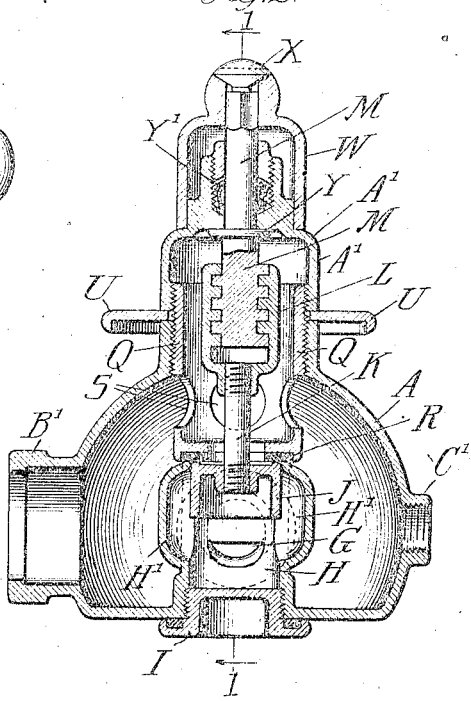
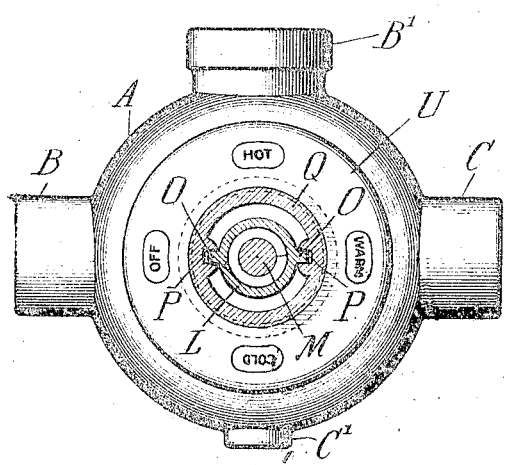
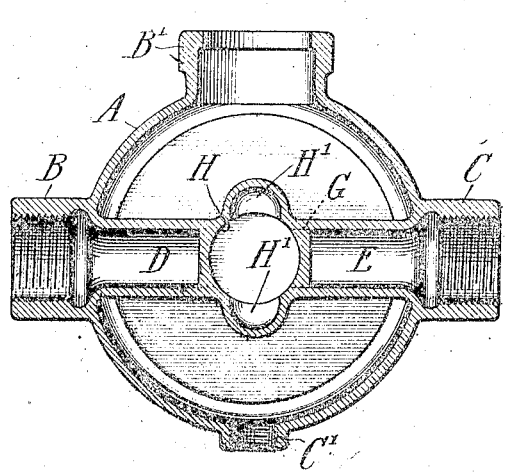
Witnesses
Martin A. Olsen
Robert Dobberman
Inventor
Earl G. Watrous
By Rector, Hibben, Davis Macauley
His Attys

UNITED STATES PATENT OFFICE.

EARL G. WATROUS, OF CHICAGO, ILLINOIS.

VALVE.

1,103,638.  Specification of Letters Patent.  Patented July 14, 1914.

Application filed August 17, 1910. Serial No. 577,659.

*To all whom it may concern:*

Be it known that I, EARL G. WATROUS, a citizen of the United States, residing at Chicago, county of Cook, and State of Illinois, have invented certain new and useful Improvements in Valves, of which the following is a description, reference being had to the accompanying drawings, forming part of this specification.

My invention relates more particularly to valves for controlling and regulating the relative supplies of hot and cold water, and is illustrated in the accompanying drawing as embodied in a shower-valve, or valve adapted to form part of a shower-bath fixture.

It has for its object the provision of a simple and efficient valve of this character in which the supplies of hot and cold water may be regulated and controlled as desired.

In the accompanying drawings, Figure 1 is a middle vertical section of the valve in the plane of the pipe connections for the hot and cold water supply pipes; Fig. 2 a corresponding view at right angles to the view in Fig. 1; Fig. 3 a horizontal section on the line 3—3 of Figs. 1 and 2; and Fig. 4 a horizontal section on the line 4—4 of the same views.

The same letters of reference are used to indicate corresponding parts in the several views.

The main casing of the valve comprises a hollow body portion or shell A provided upon its opposite sides with the pipe connections B and C for the hot and cold water supply pipes, respectively, and midway between them, at one side, with a connection B′ for the delivery pipe which leads upward to the shower-head, and at its opposite side with a connection C′ for the flexible hose connected with the usual shampoo-head. In use the valve casing will be secured in the position shown in Figs. 3 and 4, with the connection B′ projecting upward and the axis of the valve chamber and valve lying horizontal, and in describing the details of construction shown in Figs. 1 and 2 the terms upper and lower and similar ones will be used with reference to the relative positions of the parts in those figures.

The pipe-connections B and C communicate by tubular passages D E formed within the shell A of the casing, and by ports F and G, Fig. 1, with a central cylindrical valve-chamber H, whose lower end, at the bottom of the valve casing, is closed by a screw-plug I. The valve J which fits and travels in the chamber I is carried by the lower end of a valve stem K depending from an internally threaded sleeve or nut L, which is in turn carried by the threaded lower end of a spindle M suitably mounted in the upper part of the casing and having applied to it the operating handle N by which it may be turned. The sleeve or nut L is provided upon its opposite sides with projecting lugs or wings O—O which fit in vertical grooves or guideways P formed for them upon the inner surface of the cylindrical upper end of a cage Q which is externally threaded and screwed into the internally threaded upper end of the main casing A, and which projects downward into the latter and provided at its lower end with an inturned annular flange or ring which seats against the upper end of the cylindrical wall of the valve chamber H, a leather or other suitable packing ring R being interposed between the two to form a tight joint, and to also form a valve seat for the valve J, which seats against the under side of the ring R as shown. The lower portion of the cage Q, within the casing A, is provided with ports S which afford free communication between the interior of the cage and the chamber within the casing A.

Surrounding the externally threaded upper portion of the cage Q, and clamped between the cylindrical upper end of the body portion A of the main casing and a superimposed cap portion A′ which is screwed upon the upper end of the externally threaded portion of the cage Q, is an indicator plate or disk U, shown in plan view in Fig. 3, provided with suitable words or signs to indicate the various positions of the valve, and with which coöperates a pointer V upon the hollow hub W of the operating handle N, Fig. 1, said hub fitting and turning upon the reduced upper end of the cap piece A′ of the casing, and being provided in its upper portion with a polygonal opening to fit upon the correspondingly shaped upper end of the spindle M. A screw X serves to secure the handle to the spindle. The spindle M is provided with an annular collar or shoulder Y which bears against the under side of the upper end of the cap piece A' of the casing, and the latter contains a stuffing box Y' surrounding the spindle M to prevent leakage.

As will be understood from the foregoing, the valve J carried by the stem K depending from the internally threaded sleeve or nut L may be lowered from its seat R, and raised thereto, by turning the operating handle N, and the valve be thereby opened and closed. When the valve is in its normal position, shown in the drawing, it not only closes the outlet through the main valve seat at the upper end of the valve chamber H, but also the hot water inlet port F, while the cold water inlet port G is left wide open. The cold water supply is therefore normally admitted to the interior of the valve chamber H, beneath the valve J, but cannot escape from the upper end of the chamber so long as the valve remains seated. The chamber is provided in its opposite walls with two longitudinal recesses or by-passes H', Figs. 2 and 4, which extend from the horizontal plane of the cold water inlet port G to the upper end of the chamber, and when the valve J is unseated these by-passes permit the cold water supply to escape past the valve, through the valve seat at the upper end of the chamber, to the interior of the casing A, whence it passes through the delivery-pipe connection B' to the shower-head. A depression of the valve J merely sufficient to unseat it, as effected, for instance, by a quarter turn of the operating handle N, will therefore serve to admit the cold water supply only to the fixture, while further depression of the valve, effected by a half-turn of the operating handle, will serve to partially close the cold water inlet port G and partially open the hot water inlet port F, and thereby admit both hot and cold water to the interior of the casing A, and thus cause a supply of mingled hot and cold, or warm, water to be supplied to the shower-head. A further and complete depression of the valve J, as by a three-quarter turn of the handle N, will serve to entirely close the cold water inlet port G and fully open the hot water inlet port F, to admit hot water only. These several positions of the operating handle are readily determined by means of the pointer V carried by it and coöperating with the indicator plate U. The latter is made adjustable around the valve casing, so that its several indications may be brought to proper position, in assembling the valve, to coöperate with the pointer V. Thus, the word "Off" on said plate, indicating that the valve is closed, must underlie the pointer V when the valve is in fact closed. In assembling the parts of the valve structure, therefore, the indicator plate U is left loose, between the upper end of the body portion of the casing A and the lower end of the cap-piece A', until the proper position for it is determined by turning the handle and pointer until the valve is tightly closed, whereupon the plate is adjusted to proper position and then firmly clamped therein by tightening the cap-piece A' upon it.

Having thus fully described my invention, I claim:

1. A valve casing, including a cylindrical valve chamber, having an opening and a valve seat surrounding the same at one end, there being a pair of ports in the cylindrical wall of the valve chamber near opposite ends respectively thereof, conduits communicating with said ports and with the exterior of the casing, a cylindrical valve in the chamber of less length than the same, adapted to close at will either of the ports while the other is open and in communication with the valve seat or to seat upon said valve seat, and a by-pass extending longitudinally of the valve chamber.

2. A valve casing, comprising a shell A having a central cylindrical valve chamber H therein, the bore of which is uncontracted at either end and opens at one end through the shell and at the other end to the interior of the shell, the chamber being also provided with ports in its cylindrical wall, a plug for closing that opening of the valve chamber which extends through the shell, passages extending through the wall of the shell and opening into said ports, a further opening in the shell opposite the interior end of the valve chamber, a member secured within the last said opening and provided with a valve seat resting on the interior end of the valve cylinder, a valve reciprocable within the cylinder and adapted to close at will either of the above mentioned ports while the other is open and in communication with the interior of the shell through the valve seat, and to seat upon the valve seat, valve operating means extending through the last named opening in the casing, and a closure for the last said opening surrounding the valve operating means.

3. A valve casing comprising a valve chamber having an open end, ports out of register with each other intermediate the ends of the valve chamber, a cage Q and washer R, the cage adapted to clamp the washer between its lower end and the open end of the valve chamber the lower end of the casing having an opening therethrough, a by-pass extending longitudinally of the chamber and a valve adapted to close either of the ports while the other is open and in communication with the interior of the cage or to coöperate with the washer to close the opening through the lower end of the cage; substantially as described.

4. In a device of the class described, the combination of a casing A, a valve chamber H within the same having an open end and provided with ports out of register with each other, passages D E extending through the casing and connected with the ports, a cage Q connected to the casing and clamping a washer R between its lower end and the open end of the valve chamber, an opening in the end of said cage in register with the open end of the valve chamber and side openings in said cage communicating with the interior of the casing, and a valve reciprocating in said casing to close either port while the other is open and in communication with the interior of the cage or to close the opening through the end of the chamber at will, the chamber being further provided with a by-pass H'.

5. In a valve, the combination of a hollow casing A having the pipe connections B and C and the central valve chamber H open at its upper end and communicating with said connections by the passages D and E and ports F and G, the cage Q screwed into the upper part of the casing A and provided at its lower end with the annular valve-seat R resting upon the upper end of the valve chamber H, the valve J located in the chamber H and coöperating with said valve seat and with the ports F and G, a stem K on the valve the sleeve-nut L longitudinally guided but held from turning in the cage Q, and connected with the valve J by the stem K, the threaded spindle M journaled in the upper part of the casing and engaging the nut L, and the handle N applied to the spindle M for turning it; substantially as described.

6. In a valve the combination of the casing A having an internally threaded upper end, the opposing pipe connections B and C, the central valve chamber H open at its upper end and having ports F and G, and passages D and E connecting said ports with the pipe connections, the cage Q having the externally threaded upper end portion screwed into the internally threaded upper end of the casing A and projecting into the latter, and provided with the longitudinal guideways P on its upper portion, the ports S and the annular flange and valve seat R resting against the upper end of the valve chamber H, the valve J located in the chamber H and coöperating with the valve seat R and with the ports F and G, a stem K on the valve, the nut L provided with the projections O engaging the longitudinal guideways P and connected to the valve J by the stem K, the threaded spindle M journaled in the upper part of the casing and engaging the nut L and the handle N applied to said spindle for turning it; substantially as described.

7. In a valve, the combination of the casing A having the reduced and internally threaded upper end and provided with the pipe connections B and C and with the central valve chamber H open at its upper end and having the ports F and G, to which the pipe connections B and C are connected, the cage Q screwed into the internally threaded upper end of the casing A and projecting into the latter and provided with the ports S and carrying the valve seat R resting against the upper end of the chamber H, the valve J located in the chamber H and coöperating with the valve seat R and with the ports F and G, a stem K on the valve the nut L longitudinally guided but held from turning in the cage Q and connected with the valve J by the stem K, the cap-piece A' screwed upon the upper end of the cage Q and having the reduced upper portion containing the stuffing box Z, the threaded spindle M passed through said cap-piece and stuffing box and engaging the nut L, and the operating handle N applied to the spindle M and provided with the hollow hub portion W surrounding and turning upon the reduced upper portion of the cap-piece A; substantially as described.

8. In a valve, the combination of the casing A having the reduced and internally threaded upper end and provided with the pipe connections B and C and with the central valve chamber H open at its upper end and having the ports F and G, to which the pipe connections B and C are connected, the cage Q screwed into the internally threaded upper end of the casing A and projecting into the latter and provided with the ports S and carrying the valve seat R resting against the upper end of the chamber H, the valve J located in the chamber H and coöperating with the valve seat R and with the ports F and G, a stem K on the valve the nut L longitudinally guided but held from turning in the cage Q and connected with the valve J by the stem K, the cap-piece A screwed upon the upper end of the cage Q, the indicator plate U clamped between said cap-piece and the upper end of the casing A, the threaded spindle M journaled in the upper end of the cap-piece A' and engaging the nut L, and the operating handle N applied to the spindle M and provided with the hollow hub W fitting and turning upon the reduced upper end of the cap-piece A' and carrying the pointer V coöperating with the indicator plate U, substantially as described.

EARL G. WATROUS.

Witnesses:
 LOUIS B. ERWIN,
 ROBERT DOBBERMAN.